Sept. 6, 1960      T. O. SUMMERS, JR      2,951,374
POSITION AND RATE SENSITIVE GYRO
Filed Feb. 24, 1954      11 Sheets-Sheet 1
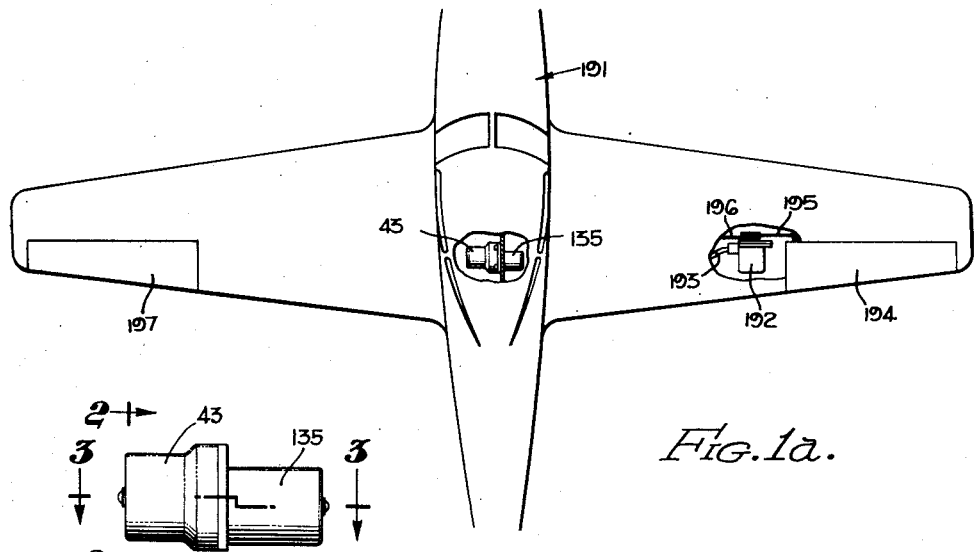
Fig. 1a.
Fig. 1.
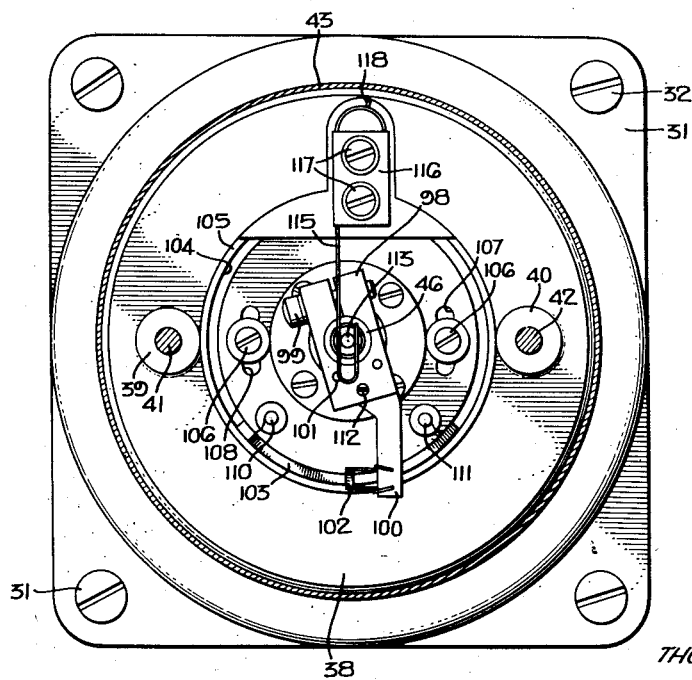
Fig. 2.
INVENTOR,
THOMAS O. SUMMERS, JR.
BY R. E. Geauque
ATTORNEY

INVENTOR,
THOMAS O. SUMMERS, JR.

Sept. 6, 1960     T. O. SUMMERS, JR     2,951,374
POSITION AND RATE SENSITIVE GYRO
Filed Feb. 24, 1954     11 Sheets-Sheet 4
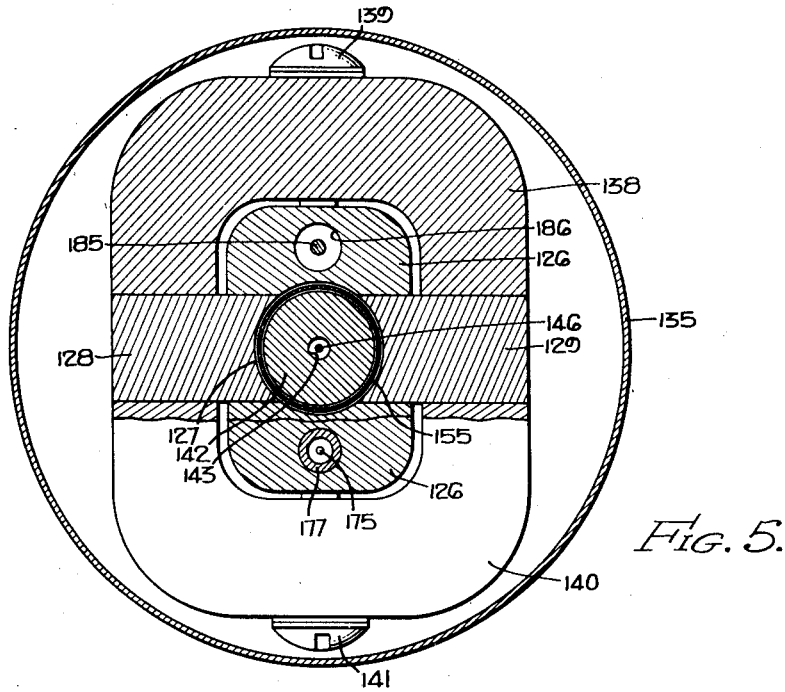
FIG. 5.
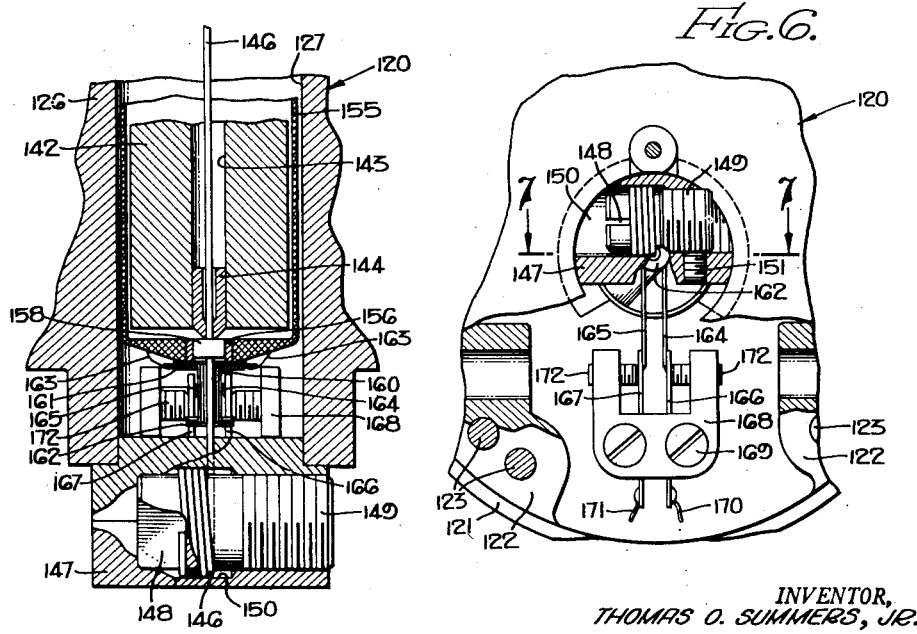
FIG. 6.
FIG. 7.
INVENTOR,
THOMAS O. SUMMERS, JR.
BY R. E. Geangue
ATTORNEY Sept. 6, 1960 T. O. SUMMERS, JR 2,951,374
POSITION AND RATE SENSITIVE GYRO
Filed Feb. 24, 1954 11 Sheets-Sheet 5

INVENTOR,
THOMAS O. SUMMERS, JR.
BY
ATTORNEY

Sept. 6, 1960     T. O. SUMMERS, JR     2,951,374
POSITION AND RATE SENSITIVE GYRO
Filed Feb. 24, 1954     11 Sheets-Sheet 6

INVENTOR.
THOMAS O. SUMMERS, JR.
BY R. E. Geauque
ATTORNEY

Sept. 6, 1960 T. O. SUMMERS, JR 2,951,374
POSITION AND RATE SENSITIVE GYRO
Filed Feb. 24, 1954 11 Sheets-Sheet 8
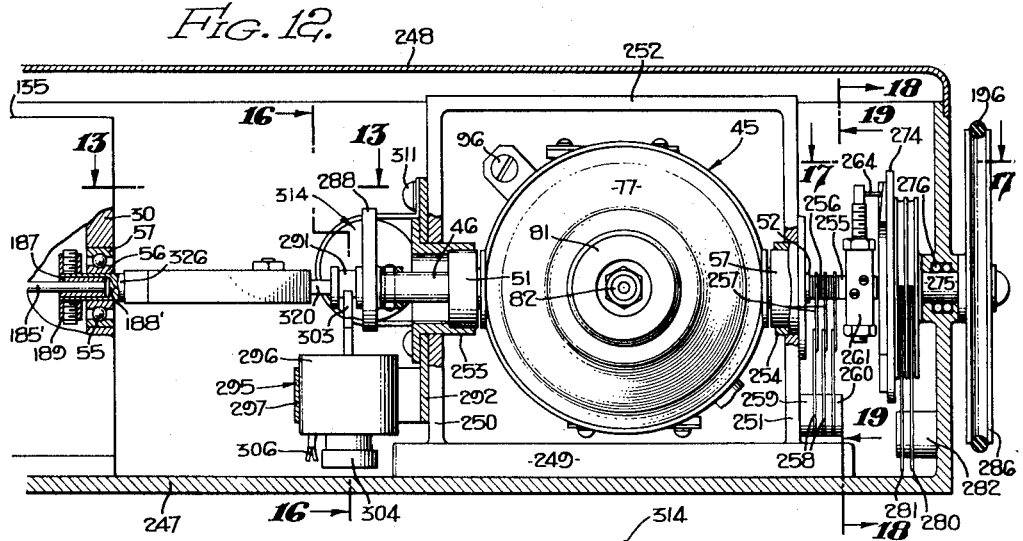
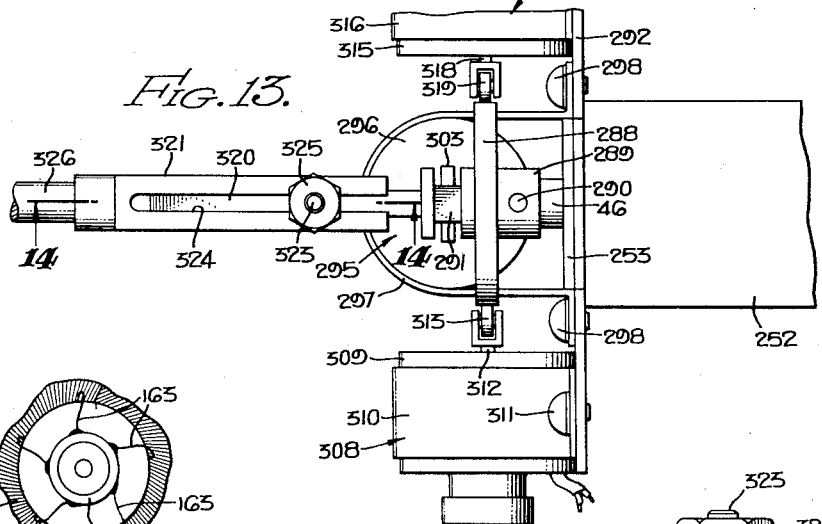
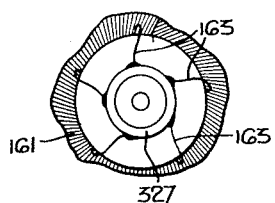
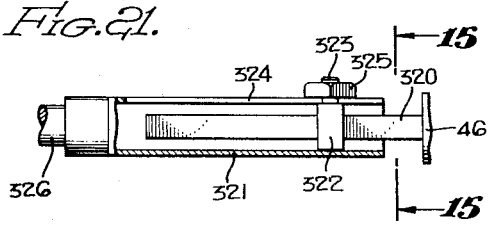
INVENTOR,
THOMAS O. SUMMERS, JR.
BY
ATTORNEY

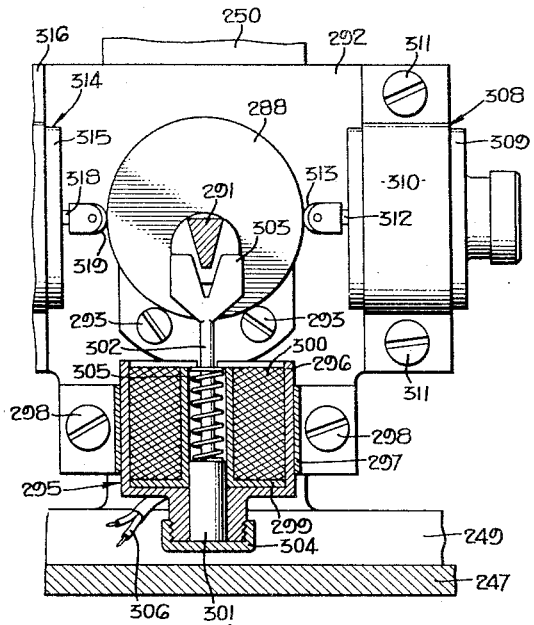
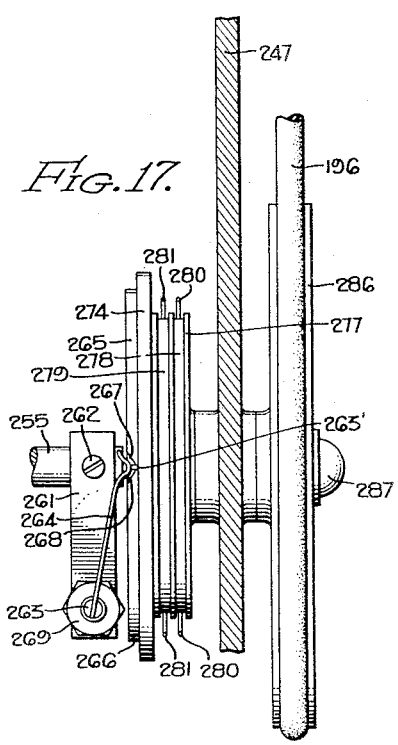
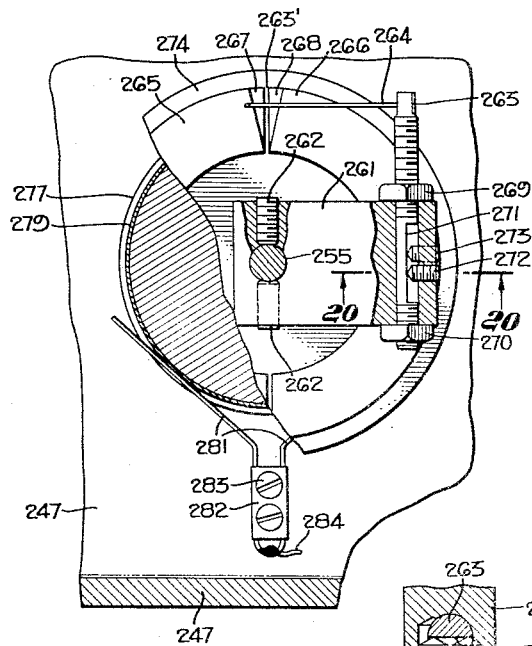
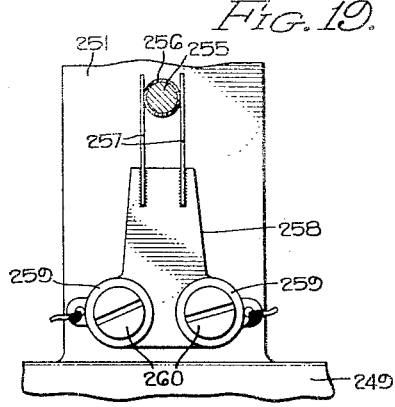
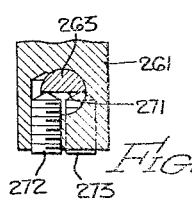

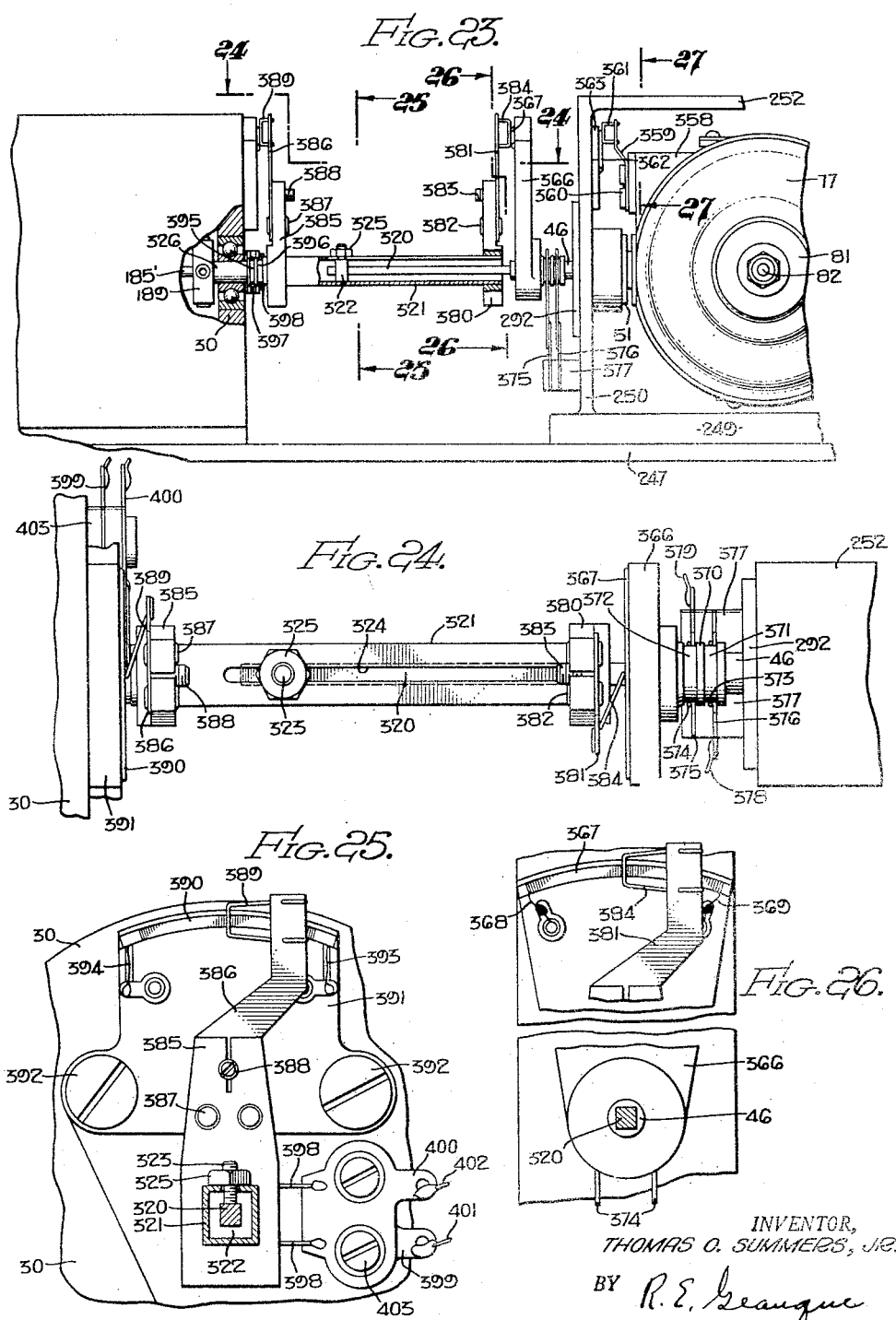

Sept. 6, 1960     T. O. SUMMERS, JR     2,951,374
POSITION AND RATE SENSITIVE GYRO
Filed Feb. 24, 1954     11 Sheets-Sheet 11

INVENTOR,
THOMAS O. SUMMERS, JR.
BY R.E. Geauque
ATTORNEY

United States Patent Office 2,951,374
Patented Sept. 6, 1960

2,951,374

POSITION AND RATE SENSITIVE GYRO

Thomas O. Summers, Jr., Encino, Calif., assignor to Summers Gyroscope Company, Santa Monica, Calif., a corporation of California Filed Feb. 24, 1954, Ser. No. 412,314

37 Claims. (Cl. 74—5.5)

This invention relates to integrating gyroscopes sensitive to angular motion of vehicles such as air, land, and water craft. In particular, it relates to a single-gimbal control gyro providing on a single pickoff the algebraic sum of angular rate plus displacement of such vehicles.

In conventional control systems, a two-gimbal gyro generally is employed to signal displacement of the craft, and a spring-restrained single gimbal gyro to signal its angular velocity. These signals are added algebraically, ordinarily by an electronic device, and this combined rate and displacement signal usually controls a servo motor adapted to motivate an appropriate control surface of the craft. It is further the practice to utilize either an electrical or a mechanical follow-up device to remove the rate plus displacement signal in proportion to servo motor displacement so that the displacement of the control surface will be proportional to the magnitude of the rate plus displacement signal. Heretofore, in order to obtain the algebraic sum of rate plus displacement, various schemes have been employed, but invariably rate and displacement are obtained separately by separate devices and the outputs mixed with a third device. Such methods are complicated and therefore costly and not always dependable.

When attached to an angularly moving object such as an aircraft, for example, the torque exerted by the gimbal of a single gimbal gyro is proportional to the angular velocity of the aircraft about the input axis of the gyro. Therefore, if the gimbal is restrained by a torque proportional to its angular velocity, the gimbal velocity will be proportional to the angular velocity of the aircraft about the gyro input axis, and therefore the gimbal displacement will be proportional to the displacement of the aircraft. In applicant's co-pending application, Serial No. 412,313, filed February 24, 1954, a single gimbal gyro is restrained by a damper motor adapted to exert a torque proportional to gimbal velocity. In the aforesaid co-pending application the gimbal is rigidly connected to this motor. By the present invention, it is proposed to effect this connection with a rate spring, the displacement of which will be proportional to the torque exerted by the single-gimbal gyro and therefore proportional to the angular velocity of the device about its input axis. Thus, it is intended for the gimbal, in response to movement of the craft about its input axis, to be displaced further in the construction contemplated than in the aforesaid structure where the gimbal is rigidly connected to the damper motor. This added displacement of the gimbal is proportional to rate, and therefore the total displacement of the gimbal about its input axis is the algebraic sum of rate plus displacement. Thus it is intended that a single pickoff, positioned about the gimbal axis, shall signal the algebraic sum of rate plus displacement, in the position and rate sensitive gyro presently contemplated.

In such a position and rate-sensitive gyro, it is simple to provide separate displacement and rate pickoffs to signal position and rate, respectively, and such individual pickoffs are useful when such a gyro is used to replace a reference and a rate gyro in a conventional control system. By providing such separate pickoffs it is not necessary to obsolete the remaining circuitry after the reference and rate gyros are removed from the system. Therefore, in one form of the invention, the position and rate sensitive gyro can be equipped with three pickoffs; one positioned about the gimbal axis to signal the algebraic sum of rate plus displacement; one adapted to measure the displacement of the rate spring to signal the angular rate of the aircraft about the gyro input axis; and still another adapted to measure the actual displacement of the damper motor to signal the displacement of the aircraft about the input axis.

The position and rate sensitive gyro of this invention can be utilized in a control system for the mounting craft and this system can incorporate either an electrical or mechanical follow-up system to provide the usual follow-up action. The damper motor utilized to exert a torque on the gyro gimbal proportional to angular velocity is constructed to have minimum inertia and minimum losses and this same damping motor can be provided with brushes to supply a voltage to the armature for torquing or caging the gyro. Since the brushes are a source of friction, a gear train is positioned between the damping motor and the gyro gimbal to provide a high armature-to-gimbal mechanical advantage and thereby minimize the effect of brush friction since both the damping force of the armature and its mechanical advantage over the gimbal increase with the gear ratio causing the damping resistance to increase with the square of the gear ratio while the brush friction only increases proportional to the gear ratio. As an alternative, the torquing and caging of the gyro can be accomplished independently of the damping motor by force exerting means acting directly on the gyro gimbal. In certain cases, it may be desirable to be able to adjust the rate spring so that the portion of the control signal representing rate can be varied to obtain the most desirable signal for stability purposes. It is understood that various types of springs can be interposed between the damping motor and the gyro gimbal and that these various types can be made adjustable.

It is therefore an object of the present invention to provide a small, compact, lightweight, reliable and comparatively inexpensive position and rate sensitive gyro equipped with at least one pickoff capable of providing the algebraic sum of displacement plus rate of displacement of a vehicle moving angularly about the input axis of the position and rate sensitive gyro.

Another object of the invention is to provide a position and rate sensitive gyroscope having a single gimbal whose movement is opposed by a torque proportional to gimbal velocity and wherein the torque exerting means is connected to the gimbal through a flexible coupling, which permits the gimbal to be displaced relative to the torque exerting means.

A further object of the invention is to provide a control gyroscope comprised of a single gyro gimbal connected to a damper motor through a rate spring, so that a portion of the gyro displacement is proportional to rate and a portion of the displacement represents the displacement of the craft about the input axis of the gyro.

A still further object of the invention is to provide a single gimbal gyro having the gimbal connected to a torque exerting means through a rate spring so that the displacement of the gyro will be the algebraic sum of displacement of the craft and of rate of displacement as determined by the flexing of the spring.

Another object of the invention is to provide a control system for a movable craft in which a single gimbal gyro is connected to a damper motor through a rate spring and in which the damper motor is provided with brushes to both torque and cage the gyro by applying a voltage to the armature of the motor.

A further object of the invention is to provide a control gyro in which the single gimbal of the gyro is connected to a damper motor through a rate spring and in which the gyro is independently torqued and caged by a manually controlled signal.

A still further object of the invention is to provide a control system for a movable craft comprising a single gimbal gyro in which the gimbal is connected to a damper motor through a rate spring and in which there are three pickoffs for separately providing a rate signal, a displacement signal, and a signal of the algebraic sum of rate and displacement.

Another object of the invention is to provide a control gyroscope having a single gimbal connected to a damping motor by a rate spring so that the signal of the gyro is the algebraic sum of rate and displacement and in which the rate spring is adjustable to vary the portion of the signal representing rate.

These and other objects of the invention not specifically enumerated above will become readily apparent from the accompanying description and drawings in which:

Figure 1 is a side elevational view of the casing for the gyro of this invention.

Figure 1a is a plan view of an aircraft showing the manner in which the various forms of the invention are mounted therein in position to be sensitive to angular movements of the craft about its roll axis and also illustrating the manner in which the servo unit controlled by the gyroscope is connected to the control surface of the craft.

Figure 2 is a vertical sectional view along line 2—2 of Figure 1 illustrating the single pickoff utilized to obtain the algebraic sum of position and rate.

Figure 5 is a transverse vertical sectional view along line 5—5 of Figure 4 showing the magnets and pole pieces for the damper motor.

Figure 6 is a transverse vertical sectional view along lines 6—6 of Figure 4 showing the commutator and brushes for the damper motor.

Figure 7 is a horizontal sectional view along line 7—7 of Figure 6 showing the supporting wire for the motor core positioned within the armature winding.

Figure 12 is an elevational view of a first modification of the invention in which the gyro gimbal is independently torqued and caged and in which a mechanical follow-up system is utilized.

Figure 13 is a top plan view along line 13—13 of Figure 12 showing the solenoids for selectively caging and torquing the gyro.

Figure 14 is a vertical sectional view along line 14—14 of Figure 13 showing the construction of the rate spring whereby the flexibility of the spring is made adjustable.

Figure 15 is a transverse vertical sectional view along line 15—15 of Figure 14 showing a collar slidable upon the rate spring to change its flexibility.

Figure 16 is a transverse vertical sectional view along line 16—16 of Figure 12 showing the torquing cam and the caging wedge utilized in connection with the gyroscope.

Figure 17 is a horizontal sectional view along line 17—17 of Figure 12 illustrating the single pickoff element and the mechanical follow-up.

Figure 18 is a transverse vertical sectional view along line 18—18 of Figure 12 illustrating the manner in which the single pickoff is made adjustable.

Figure 19 is a transverse vertical sectional view along line 19—19 of Figure 12 showing the electrical circuitry for the gyroscope.

Figure 20 is a horizontal sectional view along line 20—20 of Figure 18 showing the adjustment for the single pickoff.

Figure 21 is an end elevation view of the damper motor showing the manner in which the coils are connected together in parallel when the commutator is eliminated.

Figure 23 is a side elevational view of a second modification of the invention in which three pickoffs are utilized to obtain rate, position, and the algebraic sum of rate and position, respectively.

Figure 24 is a top plan view along line 24—24 of Figure 23 showing the adjustable rate spring.

Figure 25 is a vertical sectional view along line 25—25 of Figure 23 illustrating the pickoff for signaling position only.

Figure 26 is a vertical sectional view along line 26—26 of Figure 23 showing the pickoff for signaling rate only.

Figure 3:
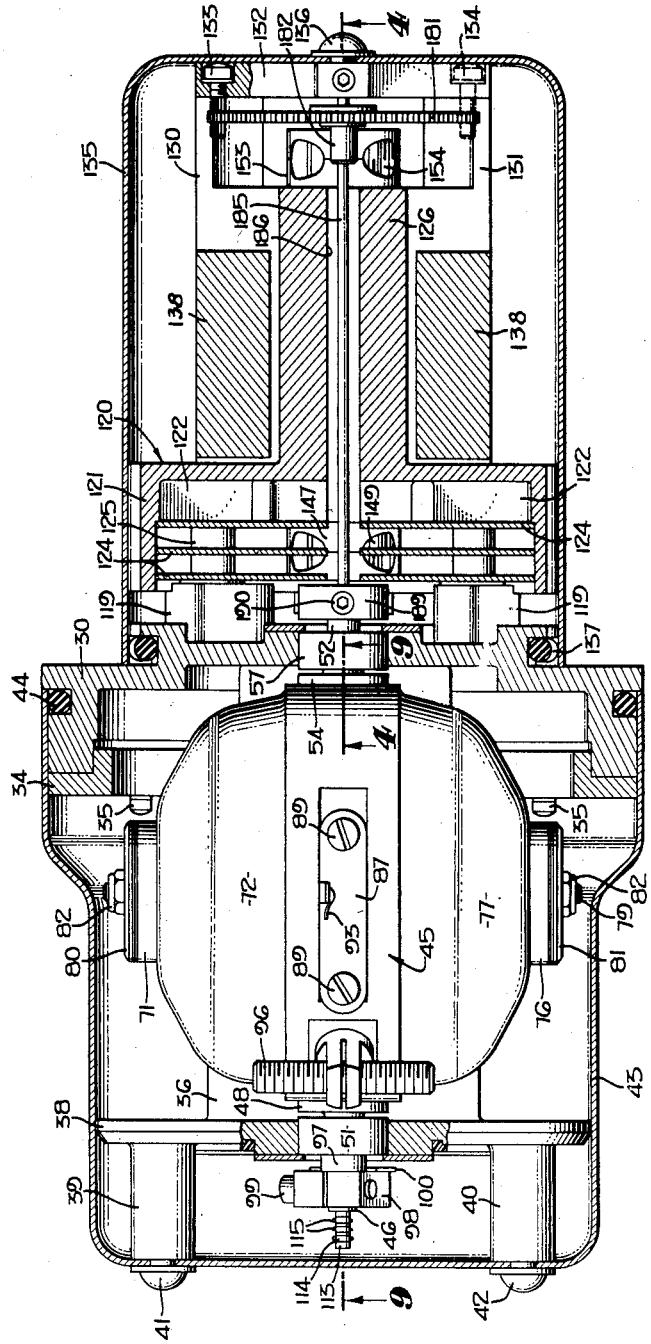
Figure 3 is a horizontal sectional view along line 3—3 of Figure 1 showing the manner in which the single gimbal of the gyroscope is mounted for movement about its input axis.
Figure 4:
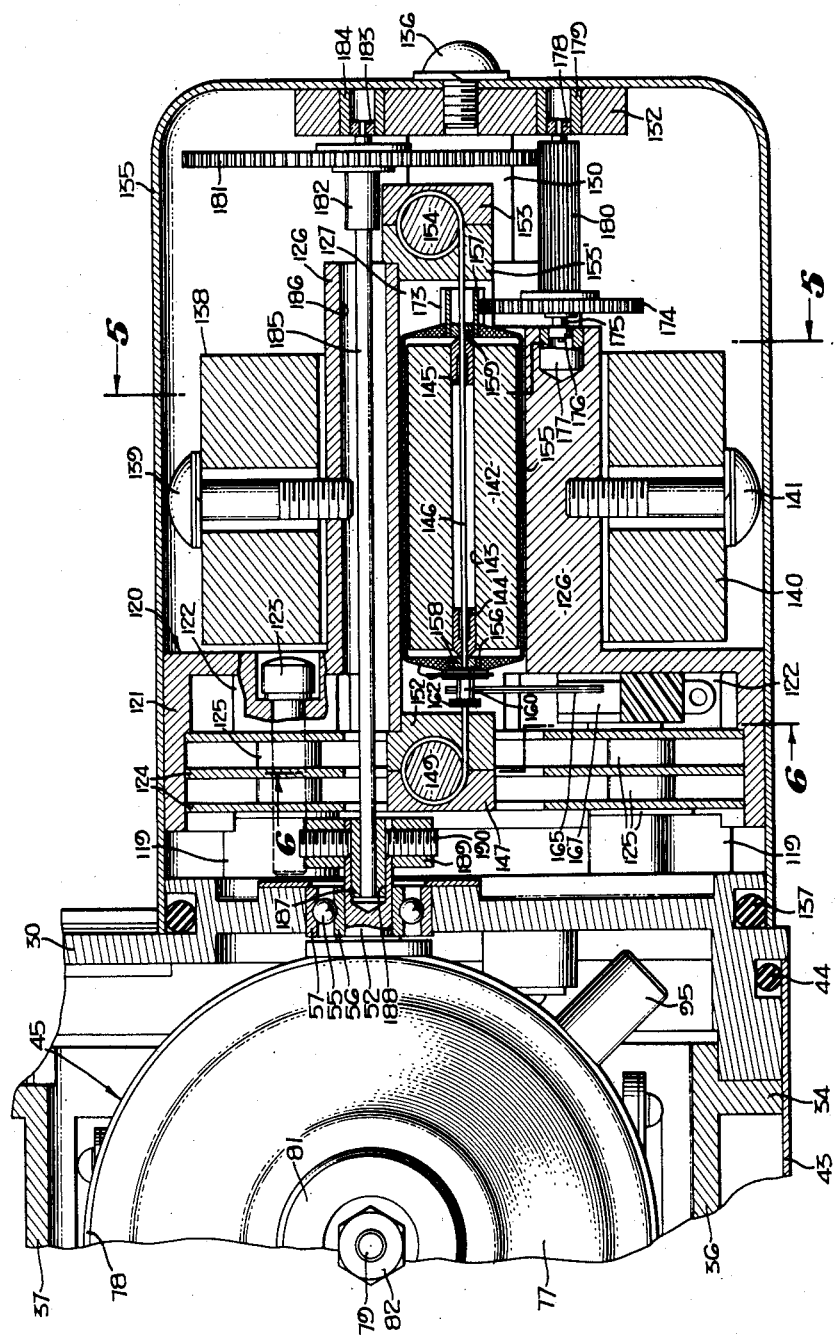
Figure 4 is a vertical sectional view along line 4—4 of Figure 3 illustrating the manner in which the single gimbal of the gyroscope is connected to the armature of the damper motor through a rate spring.

Referring first to the form of the invention shown in Figures 1 through 11, the instrument has a circular base member 30 equipped with ears 31 for receiving screws 32 to support the instrument upon the mounting structure. A ring 34 is secured to base member 30 by screws 35 and has a pair of legs 36 and 37 extending therefrom to support a plate 38 in spaced relation to the base 30. The plate 38 carries two projections 39 and 40 which receive screws 41 and 42, respectively, in order to hold cover plate 43 in position upon base plate 30. A sealing ring 44 is positioned in a groove in base member 30 and serves to make the inside of cover plate 43 dustproof. The gyroscope of the invention has a single gimbal 45 which is supported by a shaft 46 secured to the single gimbal by screws 47 passing through a flange 48. One end of the shaft 46 projects into an opening in the single gimbal while the other end is rotatively supported by ball bearings 49 retained within the plate 38 by inner race 50 and outer race 51. A second gimbal shaft 52 is likewise secured to the single gimbal 45 by means of screws 53 passing through flange 54 and one end of the shaft is inserted in an opening in the gimbal while the other end is supported by ball bearings 55 retained within base member 30 by inner race 56 and an outer race 57. Thus, the gimbal 45 is free to rotate relative to the supporting structure about the axis of the shafts 46 and 52.

Figure 9:
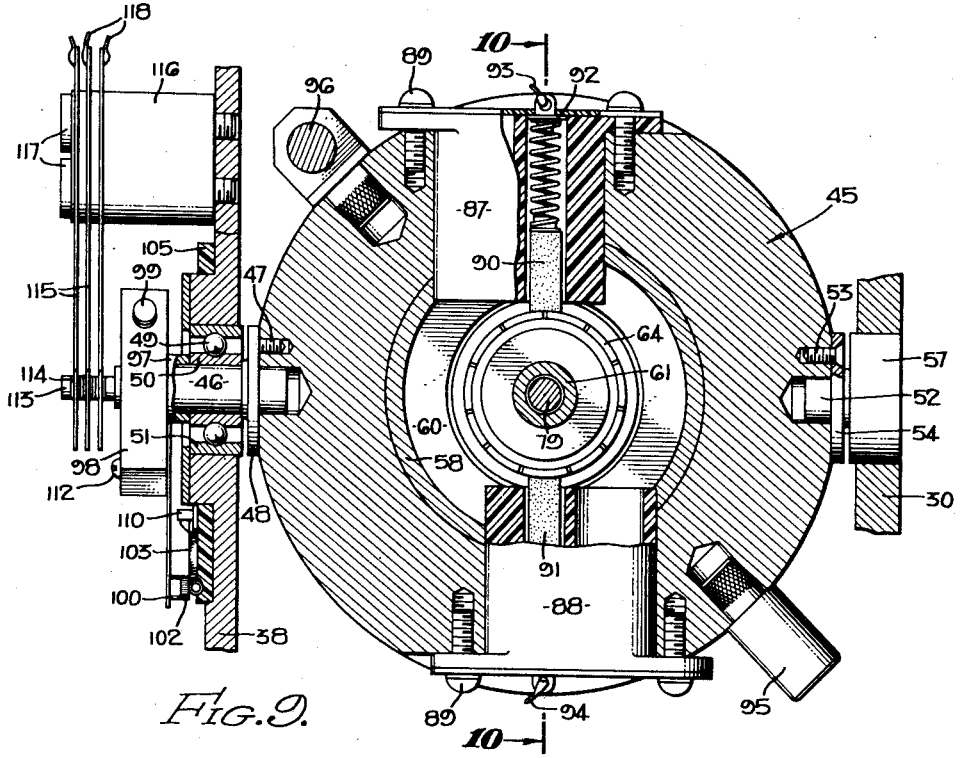
Figure 9 is a vertical sectional view along line 9—9 of Figure 3, showing the construction of the gyro gimbal and of the single pickoff connected to the gyro gimbal.
Figure 10:
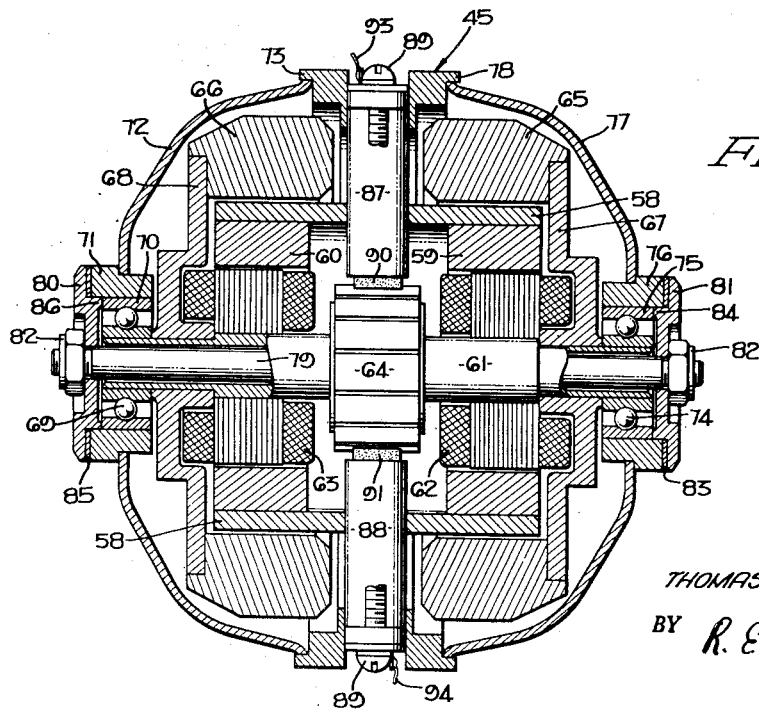
Figure 10 is a horizontal sectional view along line 10—10 of Figure 9 showing the construction of the motor for the gyroscope.

The gimbal 45 supports the symmetrical, temperature-compensated motor which is illustrated in Figures 9 and 10. A projection 58 is carried by the gimbal and supports two magnets 59 and 60 in a symmetrical position about the axis of the gyroscope. A central shaft 61 projects through the gimbal and carries armatures 62 and 63 in position to cooperate with magnets 59 and 60 respectively. The shaft 61 also supports the commutator 64 at the center of the gimbal and the symmetrical rotors 65 and 66 are secured to shaft 61 by support member 67 and 68 respectively. One end of shaft 61 is supported by ball bearings 69 having an outer race 70 positioned in a bearing retainer 71 which is centered by a cover member 72 positioned between a ledge 73 of the gimbal ring and a ledge on the bearing retainer. The other end of the shaft 61 is supported by ball bearings 74 having an outer race 75 positioned in bearing retainer 76 which is centered by a cover member 77 secured between a ledge 78 of the gimbal and a ledge on the bearing retainer. A shaft 79 passes through the shaft 61 and carries at opposite ends retainer plates 80 and 81 which are held in position against bearing retainers 71 and 76 respectively by means of nuts 82 secured to opposite ends of the shaft. A shim 83 is positioned between plate 81 and bearing retainer 76 so that projection 84 of the plate can properly position and load the outer race 75 while a shim 85 is positioned between plate 80 and bearing retainer 71 so that projection 86 of the plate can properly position and load outer race 70. The gimbal 45 has opposed openings for receiving insulated members 87 and 88, which are secured to the gimbal by means of screws 89 and these insulated members 87 and 88 carry brushes 90 and 91, respectively, which are continually forced against the commutator 64 by means of conducting springs 92, only one of which is shown. The armatures of the motor are energized through leads 93 and 94 which connect with slip rings in a manner presently to be described. The gyro gimbal has a stop 95 and may be balanced by an adjustable weight 96 in the form of a screw. It is thus seen that the changes in temperature of the atmosphere surrounding the instrument will not cause an unbalance of the gyro motor and rotor since the elements of the motor and rotor are symmetrical about the axis of the gyroscope and will expand and contract equal amounts.

The structure of the single pickoff utilized in connection with this form of the invention will now be described. The shaft 46 passes through a bracket 98 which is tightened onto the shaft by means of screw 99 passing through two arms of the bracket. The bracket has an extension 97 serving to space the bracket from plate 38. A wiper arm 100 is secured to bracket 98 by means of rivets 101 and the end of the wiper arm carries a wiper 102 which continually bears against a winding 103 carried in a groove 104 of insulated member 105, which is secured to base plate 38 by means of screws 106. The insulated disc member 105 has slits 107 and 108 to permit adjustment of the winding relative to the wiper 102 and terminals 110 and 111 connect with opposite ends of the winding 103 to provide a circuit for the winding. A screw 112 is carried by the bracket and bears against the wiper arm 100 in order to adjust the pressure of the wiper against the winding. It is thus seen that as the support for the gyroscope moves relative to the gyroscope, the wiper 102 will move over winding 103 to obtain a signal voltage for the control system presently to be described. A pin 113 is carried by the end of shaft 46 and has three slip rings 114 against which continually bear three wipers 115 which are supported by an insulated member 116 secured to plate 38 by means of screws 117. Each of the wipers connect to an electrical lead 118 in order to supply one lead to the wiper 102 and two leads for the armatures of the gyro motor, and the voltage taken off the wiper 102 is led to the control system for the mounting craft in order to control the position of the craft.

Figure 8:
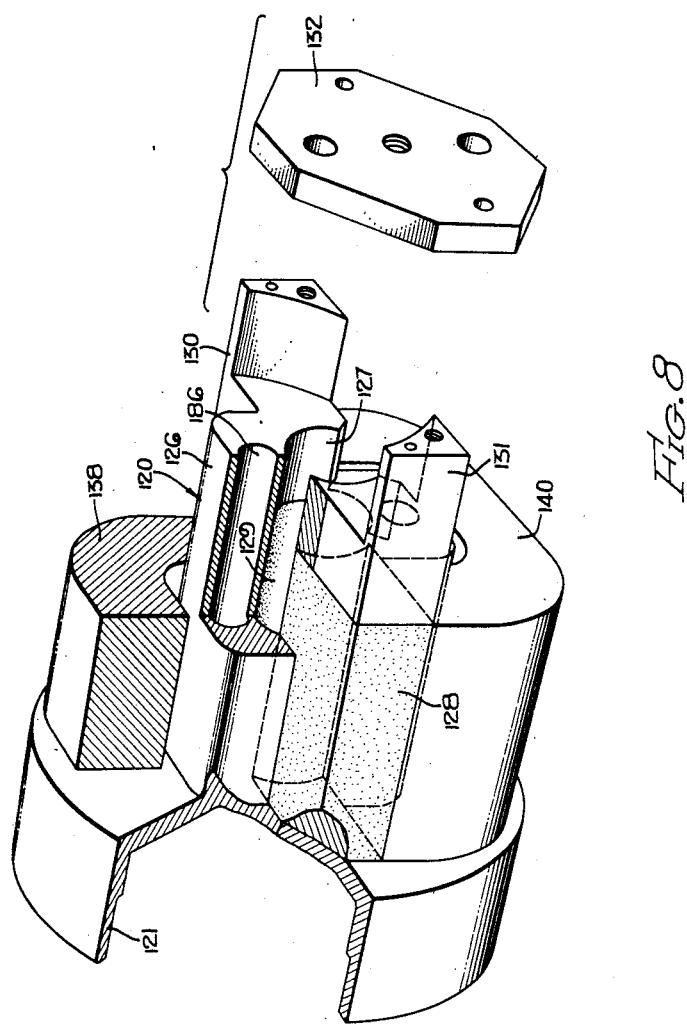
Figure 8 is a perspective view partly in section showing the mounting structure for the damper motor.

In order to support the damping motor utilized in connection with the subject invention, the base member 30 has four projections 119 which are integral with the base and the motor support frame member 120 has a cup-shaped end member 121 which likewise has four projections 122 which are positioned opposite the projection 119 on base member 30. The cup-shaped member 121 is fastened to the base member 30 by means of four screws 123 (only one being shown) which are inserted through each of the projections 122 and fastened to each of the projections 119. Three magnetic shielding members 124 are supported between the two sets of projections by screws 123 and these members are spaced apart by spacers 125. Thus, the frame member 120 is securely fastened to the base member 30 and the components of the motor are magnetically shielded from the components of the gyroscope. The construction of the frame member 120 is best illustrated in Figure 8 wherein a substantially circular member 126 is integral with the cup-shaped member 121 and projects therefrom. The member 126 has a circular opening 127 and also has opposed slots for receiving pole pieces 128 and 129 which have their inner surfaces curved to compete the circumference of opening 127. Two arms 130 and 131 project from the end of the member 126 and serve to support end plate 132 by means of screws 133 and 134. A motor cover 135 is placed around the frame member 120 and is attached to end plate 132 by means of screw 136 and the base plate 30 contains a sealing ring 137 in order to keep the inside of the cover 135 dust-free. A magnet 138 is secured to member 126 by screw 139 and surrounds one side of projection 126 with its ends bearing against the upper surface of pole pieces 128 and 129. Another magnet 140 is secured to member 126 by screw 141 and surrounds the opposite side of projection 126 with its ends bearing against the under surface of the pole pieces. Since each of these magnets has like poles bearing against the same pole piece, it is apparent that the magnets and pole pieces provide a flux path through the circular opening 127. The opening 127 contains the armature core 142 which has a central opening 143 containing support members 144 and 145 pressed into opposite ends of the opening and a support wire 146 passes through the opening 143 and through openings in the support members in order to support the armature core 142. One end of wire 146 passes through end support 147 and is secured in slot 148 of a screw 149. The member 147 has an enlarged opening 150 to receive the wire as it is wound around the screw 149 by rotation of the screw and a stop screw 151 is provided in member 147 to hold screw 149 in any selected position. An extension 152 of member 147 is circular in form so that it can be inserted into the end of opening 127 in order to center member 147. The other end of wire 146 passes through end support 153 and is secured to screw 154 in the same manner as the other end is secured to screw 149. Rotation of screw 154 will wind the wire around the screw in any desired amount and the screw can be held in position by a stop screw similar to stop screw 151. The member 153 has a projection 153' which positions the member within the end of opening 127 which is opposite from the end receiving projection 152. Thus, the wire 146 can be drawn taut through the opening in the armature core by winding the wire around screws 149 and 154 and the armature core can be positioned along the opening 127 relative to the pole pieces by winding the wire around one of the screws and unwinding it from the other.

The opening 127 likewise contains an armature winding 155 which is positioned around the armature core 142 and has two end openings for receiving support members 156 and 157 which contain jewel bearings 158 and 159, respectively, for rotatively supporting the armature winding on the wire 146. The commutator bars 160 are supported at one end by an insulated disc 161 secured to support member 156 while the other ends of the commutator bars are secured in an insulated disc 162 which holds the bars in proper spaced relationship. Each one of the commutator bars connects with one of the coils of the motor through a lead 163 and wipers 164 and 165 continually bear against the commutator bars to complete the circuit for the motor. The brushes 164 and 165 connect with conducting plates 166 and 167, respectively, which are mounted in an insulated bracket 168 secured to cup member 121 by means of screws 169. Plates 166 and 167 connect with leads 170 and 171 and screws 172, positioned in the arms of members 168, bear against the plates 166 and 167 in order to adjust the pressure of the brushes against the commutator bars. It is therefore apparent that means are provided to selectively energize the armature winding 155 of the motor and thereby exert a torque upon the gyro gimbal for the purposes later to be described.

The support member 157, at the other end of the motor opposite the commutator, carries a gear 173 which meshes with gear 174 carried by a shaft 175 which is supported at one end by bearing 176 carried by a retainer member 177 inserted in the member 126. The other end of shaft 175 is supported by a bearing 178 supported by retainer 179 positioned in end plate 132. An elongated gear 180 rotates with shaft 175 and meshes with a large gear 181 carried by a shaft 182 which has one end supported by bearing 183 positioned in retainer 184 likewise carried by end plate 132. The rate spring of this modification takes the form of a torsion rod 185 which passes through an opening 186 in member 126 and has one end secured to shaft 182. The other end of the rod 185 is inserted into a liner member 187 which is positioned within opening 188 of gimbal shaft 52 and a collar 189 on shaft 52 contains four set screws 190 which pass through openings in the shaft and press against liner member 187 so that the rod 185 will move with the gimbal shaft 52. Thus it is seen that the movement of the craft relative to the gyroscope will cause rotation of the armature winding 155 through the gear train comprised of gears 173, 174, 180, and 181 and that this relative movement will be greatly amplified by this gear train. When the armature winding 155 is not being energized by the commutator the premanent magnetic field of the motor will oppose rotation of the armature windings with a torque proportional to the angular velocity of the armature because the windings are at least partially short circuited. The motor is designed to be energized by direct current. The armature windings are self-supporting since they are impregnated with a plastic material and since this impregation material is very light the armature will have very low inertia. Since this plastic material is non-magnetic there will be no eddy current losses. Also the armature is supported upon jeweled bearings so that there is practically no bearing friction. Because of this construction it will be seen that the resistance torque opposing rotation of the gimbal is proportional to the angular velocity of the gimbal without adding undluy to the gimbal inertia. While the brushes 164 and 165 exert a frictional drag against rotation of the armature winding the effect of this friction is minimized by utilizing the gear train having a high armature-to-gimbal advantage and such a gear train is utilized since the damping torque of the motor and its mechanical advantage over the gimbal both increase with the gear ratio causing the damping resistance to increase with the square of the gear ratio while the brush friction increases only in proportion to the gear train ratio.

Because of the reacting torque exerted by the damper motor upon the gimbal, the rod 185 will be placed under a torsional force and will twist a certain amount depending upon the torque exerted by the gimbal. Since the torque exerted by the gimbal is proportional to the angular velocity of the mounting craft, or in other words to rate of movement, the amount of twist developed in the rod 185 will be proportional to the angular velocity and to rate. Also, since the torque exerted by the damping motor against displacement of the gimbal is proportional to the displacement velocity, the gimbal velocity will be proportional to the angular velocity of the aircraft about the input axis and therefore gimbal displacement will be proportional to the displacement of the craft. Thus, the total displacement of the gimbal relative to the craft upon movement of the craft about the input axis of the gyro has two components, namely, one representing the twist in rod 185 resulting from the torque of the gimbal which is proportional to angular velocity and the other representing displacement of the damper motor resulting from motor rotation due to gimbal velocity, which displacement is proportional to displacement of the craft. Thus, the pickoff, comprised of wiper 102 and winding 103, will measure the displacement of the gyro gimbal relative to the mounting craft when movement occurs about the input axis of the gyro, and this single pickoff will signal the algebraic sum of rate plus displacement. Such a signal is highly desirable for control purposes and is attained without the necessity of measuring rate and displacement separately and then mixing the two signals.

Figures 11, 22:
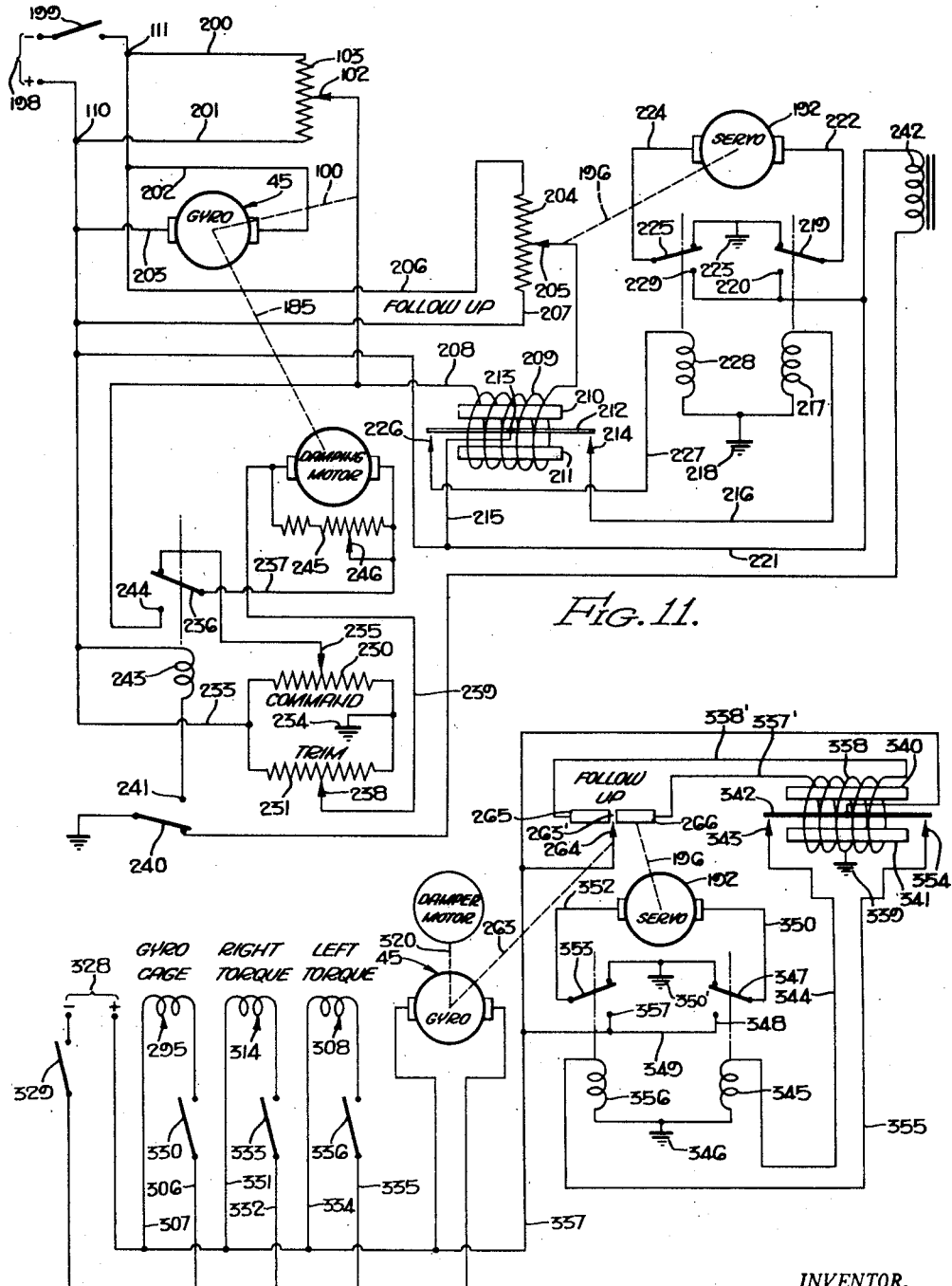
Figure 11 is a schematic wiring diagram of the control system incorporating the position and rate sensitive gyro of the present invention.
Figure 22 is a schematic wiring diagram of a control system which utilizes the first modification of the invention and which incorporates selectively operable caging and torquing solenoids.

The control system for the invention described above is illustrated in Figure 11 and the position and rate sensitive gyro is shown in Figure 1 in position to sense movement of an aircraft about its roll axis. In Figure 1, the position and rate sensitive gyro is shown mounted in an aircraft 191 with its spin axis in the vertical plane of the aircraft and the gimbal axis positioned transverse of the aircraft in the horizontal plane. The servo motor 192 is energized through control cable 193 and movement of the servo motor positions the aileron 194 through linkage 195 and at the same time moves the follow-up linkage 196. The servo 192 is controlled by the single pickoff of the position and rate sensitive gyro and it is understood that the servo motor will also control the other aileron 197 of the aircraft. Referring to Figure 11, the control system has an electrical source 198 and a manual switch 199 to energize the system. The winding 103 connects across the power source through leads 200 and 201 while the motor of the gyro is connected across the power source by leads 202 and 203. A follow-up winding 204 is connected across the power source through leads 206 and 207 and has a wiper 205 controlled by the follow-up linkage 196 in response to movements of the servo motor 192. The wipers 102 and 205 are connected together through line 208 which contains a solenoid winding 209, inside of which are positioned two permanent magnets 210 and 211 which serve to position the arm 212 between them about pivot point 213 when no current is flowing through the winding 209. However, should the aircraft move about its roll axis in a direction to move wiper 102 upwardly (as viewed in Figure 11) on winding 103, the potential at wiper 205 will become positive with respect to the potential at wiper 102 and current will flow in winding 209 from wiper 205 to wiper 102. This current in solenoid winding 209 will act with magnets 210 and 211 to cause the arm 212 to pivot against contact 214 so that current will flow through line 215, arm 212 and line 216 to solenoid winding 217 and then to ground 218. The energization of solenoid 217 will cause switch arm 219 to move against contact 220 to complete a circuit through lines 221 and 222 to servo motor 192 and then to ground 223 through line 224 and switch 225. This energization of the servo motor will cause movement of the aileron in a direction to correct the position of the aircraft and will also move follow-up wiper 205 upwardly on winding 204 until no current flows through winding 209. As the position of the aircraft is corrected, the usual follow-up action will result and the servo will bring the aircraft back to its original attitude.

When the aircraft moves about the roll axis in the opposite direction, the wiper 102 will move downwardly (as viewed in Figure 11) on winding 103 and the potential at wiper 102 will become more positive than the potential at wiper 205 and current will flow through winding 209 from wiper 102 to wiper 205 in order to pivot the arm 212 against contact 226. Current will then flow through line 215, arm 212 and line 227 to solenoid winding 228 and then to ground 218. The energization of solenoid 228 will move switch 225 against contact 229 so that current will flow through line 221, switch arm 225 and line 224 to servo motor 192 and then to ground 223 through line 222 and switch arm 219. Thus, the servo will be energized in the opposite direction from that previously described to move the aileron in a direction to correct for the displacement of the craft about the roll axis. The movement of the servo will provide the usual follow-up action on wiper 205 so that the wiper will be moved downwardly until no current flows through the solenoid winding 209 and thereafter, the servo motor will operate to move the aircraft back to its original desired position. It is thus seen that the invention provides, from a single pickoff, a signal which is the algebraic sum of position and rate and that this signal can be utilized to control the mounting craft in order to maintain the desired attitude about the input axis of the gyro. Further, the invention eliminates the necessity of utilizing both a gyro vertical and a rate gyro to signal displacement and rate, respectively, and thereby also eliminates the necessity of mixing these separate signals for control purposes.

Since the damper motor is provided with a commutator for applying a voltage to the armature winding, it is possible to cage the gyro gimbal to any preselected position and also to exert torques on the gyro gimbal to maneuver the mounting craft. In order to maneuver the aircraft, a command potentiometer 230 and a trim potentiometer 231 are connected in parallel between line 233 and ground 234. The wiper 235 for the winding 230 is connected to one side of the damper motor through a switch 236 and line 237 while the wiper 238 for the winding 231 is connected to the other side of the damper motor through line 239. Therefore, when the wiper 235 is manually moved to one side or the other of the corresponding position of wiper 238, current will flow in one direction or the other through the damper motor and cause the motor to torque the gyro gimbal in the desired direction. When the wiper 235 is moved back to its reference position opposite wiper 238, torquing of the gimbal by the motor will cease. When it is desired to cage the gyro gimbal to a preselected position as determined by the position of wiper 238 on the trim potentiometer, the switch 240 will be moved against contact 241 thereby disconnecting the electrically operated clutch 242 of the servo and at the same time energizing solenoid winding 243 in order to move switch 236 against contact 244 and thereby disconnect the command potentiometer from the damper motor. This movement of switch 236 causes the damper motor to detect any potential difference between wiper 102 and wiper 238 with the proper polarity such that the motor will torque the gyro gimbal 45 in such a direction as to null the potential between wiper 102 and wiper 238. When this condition is established, the gyro is caged in a position determined by the position of the trim wiper. Of course, any movement of wiper 102 will result in a corresponding movement of wiper 205 in the manner previously described. It is necessary to de-energize clutch 242 so that the gyro gimbal can move to caged position without resulting in aileron movement by the servo.

The control system just described makes it possible to completely control the aircraft about one of its axes, corresponding to the input axis of the gyro, and while the gyro has been described as controlling the aircraft about its roll axis, it is obvious that it can control the aircraft about any one of its other axes. As previously mentioned, the utilization of the damper motor to both torque and cage the gyro is accompanied by brush friction but this friction is overcome by providing a gear train between the damper motor and the gyro which has a high armature to gimbal advantage. A shunt winding 245 is placed across the leads of the damper motor and has an adjustment wiper 246 which can vary the damping action of the motor so that the portion of the signal on winding 103 resulting from displacement of the craft can be varied.

A modification of the invention is illustrated in Figures 12 through 22 and differs from the one previously discussed in that it has an on-off pickoff with a mechanical follow-up system and the gyro is torqued and caged by means operated independently of the damper motor. The instrument is enclosed in a casing 247 which has a cover plate 248 and the casing supports a base 249 having upstanding legs 250 and 251 supporting a cross member 252. The gyroscope is constructed the same as illustrated in the previous embodiment and has a gimbal ring 45 with shafts 46 and 52 supported in bearings having outer races 51 and 57, respectively, which are secured in bearing retainers 253 and 254 positioned in openings in legs 250 and 251, respectively. The shaft 52 has an extension 255 which mounts three slip rings 256 against which bear three double wipers 257, each of which is supported by a conducting plate 258 mounted by insulated posts 259 which are secured to upright leg 251 by means of screws 260. The slip rings 256 and wipers 257 form separate circuits for the parts of the instrument which move relative to the mounting frame. The extension 255 carries a bracket 261 which is secured thereto by means of set screws 262 and the bracket has an opening for receiving arm 263 which supports a wiper 264. The wiper is positioned to coact with two spaced conducting plates 265 and 266 which have tapered surfaces 267 and 268 respectively on opposite sides of the space 263' separating the two plates. The arm 263 is threaded to receive positioning nuts 269 and 270 so that the V-shaped end of the wiper can be moved up and down with respect to tapered surfaces 267 and 268. Also, the arm 263 has a flat surface 271 positioned within bracket 261 and two set screws 272 and 273 press against opposite edges of the surface 271 so that the arm 263 can be rotated and locked in any position in order to move the V-shaped end of the wiper toward or away from surfaces 267 and 268. Thus it is seen that the sensitivity of the pickoff comprised of wiper 264 and conducting plates 265 and 266 can be adjusted in any desired manner.

The contact sections 265 and 266 are carried by an insulated disc member 274 which is rotatably mounted on a shaft 275 supported by bearings 276 positioned in casing 247. The disc member 274 has an extension 277 which supports conducting rings 278 and 279 against which bear double wipers 280 and 281. These wipers are supported by an insulated post 282 which is secured to frame 247 by screws 283 and these wipers each have a lead 284 for connecting the conducting plates to the control system for the mounting craft. It is understood that ring 277 is connected to conducting plate 266 and that ring 276 is connected to conducting plate 265. A pulley 286 is secured to the end of shaft 275 by screw 287 and the follow-up cord 196 rides in the groove of the pulley and connects the pulley with the servo motor 192 illustrated in Figure 1. Thus, it is apparent that any movement of the gyroscope relative to its mounting frame will cause the wiper 264 to move relative to contact plates 265 and 266 and that the follow-up action through pulley 286 will move the space 263' between these two contact plates so that it will follow the position of the wiper. Thus, the gyroscope of this modification is equipped with the usual type of on-off pickoff with mechanical follow-up.

The end of shaft 46 carries a cam member 288 which has an extension 289 secured to the shaft by screw 290 and also has an extension 291 in the form of a V-shaped wedge member. A support plate 292 is secured to leg 250 by screws 293 which likewise secure the bearing retainer 253 to the leg. A first solenoid 295 has a circular body member 296 secured to support member 292 by strap 297 and screws 298. The body member receives a member 299 which supports winding 300 of the solenoid and also has a central opening for receiving the armature 301 which is connected by a shaft 302 to a wedge-shaped caging member 303. The armature is normally biased against the end cap 304 of the body member by a spring 305 so that the caging member 303 is out of contact with wedge member 291. However, when the winding is energized through the leads 306, the armature core will be pulled against the spring 305 and will cause the caging member 303 to engage and turn wedge 301 until the wedge is inserted in the V-shaped groove of the caging member. Thus, the gyro can be selectively moved to any preselected caged position and will be rigidly held in this position so long as solenoid 295 is energized.

A solenoid 308, identical in construction to the solenoid 295, has a body portion 309 secured to mounting plate 292 by circular bracket 310 and screws 311. Operating arm 312 of the solenoid carries a roller 313 which pushes against the cam 288 at a point above the center line of shaft 46 in order to torque the gyro gimbal in one direction when the solenoid 308 is energized. Another electromagnet 314, also similar in construction to the solenoid 295, has a body portion 315 which is secured to mounting plate 292 by a circular bracket 316 and screws 317. The arm 318 of the solenoid 314 carries a roller 319 which likewise bears against the cam member 288 at a point above the center line of shaft 46 and serves to torque the gyro gimbal in the opposite direction when electromagnet 314 is energized. Therefore, the gyro gimbal can be torqued in either direction about its axis in order to maneuver the craft in any desired manner and the solenoids can be selectively operated independently of the damper motor.

The rate spring of the present modification is comprised of a square torsion shaft 320 which is connected at one end to the wedge member 291 so that this end will turn with gimbal shaft 46. The other end of the torsion spring 320 is inserted into a central opening in a square collar 322 which fits snugly into a square member 321. The member 321 has a slot 324 through which projects a pin 323 having a nut 325 for holding the collar in any selected position along the shaft 320. By adjusting the position of the collar along the shaft, it is possible to adjust the amount of twist allowed in the shaft in response to a torque produced by the gyro gimbal since the collar serves to adjust the effect length of the torsion shaft. A shaft 326 extends from member 321 and contains an opening 188' corresponding to the opening 188 in gimbal shaft 52 of the previous embodiment. Ball bearings 55, having inner race 56 and outer race 57, support shaft 326 within member 30. It is understood then that the shaft 326 connects to the damper motor in the same way as shaft 52 of the gimbal in the previous embodiment and the opening 188' has a liner 187 for receiving shaft 185' which is secured within the opening 281 by the screws in collar 189. However, since the flexible rate spring is comprised of shaft 320, the shaft 185' will be so constructed that it will have high torsional resistance and no twist will be allowed in this shaft. Otherwise, shaft 185' serves the same purpose as shaft 185 of the previous embodiment in that it transmits the movement of the gimbal 45 to the armature of the damper motor.

This modification of the invention can be utilized in the control system of Figure 22 to position the mounting craft 191 about the roll axis through energization of servo motor 192 and it is understood that the control system includes an on-off pickoff and mechanical follow-up, as well as rate spring which can be made adjustable to vary the amount of rate in the signal from the pickoff. Since the torquing and caging of the gyroscope is accomplished by means independent of the damper motor, it is possible to eliminate the commutator from the motor and tie the coils of the damper motor together in parallel by connecting each of the leads 163 to a common ring 327 mounted on the insulated disc member 161 as illustrated in Figure 21. Referring to the wiring diagram of Figure 22, a power source 328 is controlled by a manual switch 329 and the caging solenoid 295 is connected across the power source by leads 307 and 306. A selectively operated switch 330 in lead 306 serves to energize the electromagnet when it is desired to cage the gyro. The right torque solenoid 314 is connected across the power source by leads 331 and 332 and lead 332 contains a manually operated switch 333 for selectively torquing the gyroscope when it is desired to move the aircraft in one direction about the input axis of the gyro. The electromagnet 308 for obtaining a left torque on the gyro gimbal is connected across the power source by leads 334 and 335 and lead 335 contains a manual switch 336 for selectively torquing the gyroscope when it is desired to move the aircraft in the other direction about the input axis of the gyro.

In operation of the system, movement of the aircraft 191 about its roll axis in one direction will cause the contact plate 266 to move under wiper 264 and current will flow from line 337 through contact plate 266, line 337' and the left half of center-tapped solenoid winding 338 to ground 339. The solenoid winding surrounds two permanent magnets 340 and 341 which normally position the pivoted arm 342 in a central position between the magnets. However, when current flows through the left half of the center-tapped winding, the arm 342 will pivot against contact 343 and cause current to flow through line 344 to solenoid 345 and then to ground 346. The operation of solenoid 345 will move switch 347 against contact 348 and current will flow through line 349 and line 350 to servo 192 and then to ground 350' through line 352 and switch 353. Thus, the servo 192 will move the aileron of the aircraft in a direction to correct for the displacement of the aircraft about the roll axis and at the same time the follow-up linkage will move the contact plate 266 in a direction so that the space 263' between the contacts will again come underneath the wiper 264. As the control system continues to correct for the displacement of the aircraft, the usual follow-up action will take place and contact plate 266 will return to its original position corresponding to the desired attitude of the aircraft.

When the aircraft moves about the roll axis in the opposite direction, the contact 265 will move under wiper 264 and current will flow in line 338', contact plate 265 and the right side of solenoid winding 338 and then to ground 339. The field of the winding will pivot the arm 342 against the contact 354, which will cause current to flow through line 355 to solenoid 356 and then to ground 346. Energization of solenoid 356 will move switch arm 353 against contact 357 and current will flow through switch 353 and line 352 to the servo 192 and then through line 350 and switch 347 to ground 350'. Thus, the servo will be energized in the opposite direction to move the control surfaces to correct for displacement of the aircraft and the follow-up 196 will move contact 265 with the servo in order to provide the usual follow-up action. It is understood that the gyro gimbal 45 is connected to the damper motor through the torsion shaft 320 and through the rigid shaft 185' so that the damping resistance of the damper motor to gimbal movement is proportional to the velocity of the gimbal. Also, it is understood that the shaft 320 will be twisted by the torque developed by the gyro gimbal and that the position of the wiper 264 will therefore be the algebraic sum of position and rate. By adjusting the position of collar 322, it is possible to vary this algebraic sum by changing the amount of the rate signal present at the single pickoff.

A second modification of the invention is illustrated in Figures 23 through 28 and this modification likewise utilizes an adjustable torsion shaft between the gyro gimbal and the damper motor. However, this modification differs from previous embodiments in that three pickoffs are utilized, one for signaling pure rate, one for signaling position and one for signaling the algebraic sum of position and rate. Referring to Fig. 23, like reference numerals represent like parts as in the previous embodiment and the gyroscope has a casing 247 carrying a base 249 which supports upright legs 250 and 251 (not shown) connected together by cross member 252. The leg 250 contains a bearing retainer 292 which contains the bearing for the shaft 46 while the other shaft 52 for the gyro gimbal is supported by bearing retainer 254 in leg 251 as illustrated in Figure 12. Current is supplied to the gyro motor and other components movable with the gimbal through slip rings carried by shaft 52. The gyro gimbal has a member 358 to which is attached a wiper arm 359 by means of screws 360 and a wiper 361 is carried by the wiper arm in position to continually bear against the winding 362 carried by an insulated plate 363 supported by upright leg 250. The lead for wiper 361 connects with a slip ring on shaft 52 while the leads 364 and 365 connect with the ends of the winding 362. The signal picked off by wiper 361 will represent the total displacement of the gimbal relative to the casing and will be the algebraic sum of position and rate for reasons presently to be discussed.

An insulated arm 366 is secured to shaft 46 and carries a winding 367 having leads 368 and 369. The arm 366 has a hub 370 mounting slip rings 371 and 372 which connect with leads 368 and 369 respectively, in order to provide a circuit to winding 367. Double wipers 373 and 374 continually bear against slip rings 371 and 372 respectively and these wipers are mounted by conducting plates 375 and 376 respectively which are supported by insulated posts 377 secured to leg 250. The plates 375 and 376 are connected respectively to leads 378 and 379 in order to provide a circuit for the winding 367. The rate spring of this modification is comprised of torsion rod 320, described in the previous embodiment, which is secured to the end of shaft 46 and extends into the square member 321. The collar member 322 is inserted within member 321 and has an opening for receiving shaft 320. A pin 323 is carried by collar 322 and projects through a slot 324 in member 321 so that the position of the collar along the shaft 320 is adjustable and the collar can be held in any selected position by nut 325 threaded onto a pin 323. Thus, by adjusting the position of the collar along the shaft 320, it is possible to adjust the amount of twist allowed in shaft 320 in response to a torque produced by the gyro gimbal. The open end of member 321 carries an arm 380 to which is secured a wiper arm 381 by means of rivets 382 and the arm 380 carries a screw 383 having one end bearing against the wiper arm in order to adjust the pressure of wiper 384 against winding 367. Since the winding 367 moves with the gyro gimbal and since the wiper 384 moves with member 321, the displacement of the wiper relative to the winding will signal the amount of twist allowed in the rate spring or in other words will signal pure rate in a manner to be described.

The other end of member 321 carries an arm 385 which supports a wiper arm 386 by means of rivets 387 and screw 388 bears against the wiper arm 386 to adjust the pressure of wiper 389 against the winding 390. This winding is supported by an insulated member 391 which is secured to frame member 30 by means of screws 392 and leads 393 and 394 connect with opposite ends of the winding. The shaft 326 extends from member 321 and carries slip rings 395 and 396 which connect with wipers 384 and 389 respectively, and double wipers 397 and 398 bear against slip rings 395 and 396 respectively. The double wiper 397 is supported by a conducting plate 399 while the wiper 398 is supported by conducting plate 400 and leads 401 and 402 connect respectively to these conducting plates which are supported by posts 403 attached to member 30. The signal from wiper 389 represents the displacement of member 321 relative to member 30 and will therefore give a signal of position only because of the reasons presently to be described.

The shaft 326 contains an opening 188' which has a liner 187 for receiving shaft 185' which is secured therein by the screws in collar 189. As in the previous embodiment of Figure 12, the shaft 185' serves to rigidly connect shaft 326 with the armature 155 of the damper motor since the torsion shaft 320 serves as the rate spring. The shaft 185' is so constructed that no twist will be allowed therein and the resistance of the damper motor to displacement of the gyro will be transmitted directly to shaft 326 while the twist in shaft 320 will permit displacement of the gimbal shaft 46 relative to the shaft 326. As illustrated in Figure 23, the armature is connected to shaft 326 through a gear train and the armature is provided with a commutator so that energization of the armature will torque the gimbal. Thus, the signal of the wiper 361, movable with the gyro gimbal relative to the mounting frame, will have a component representing the displacement of the damper motor armature and also a component representing the displacement of the rate spring and therefore, this wiper will signal the algebraic sum of position and rate. On the other hand, the wiper 384 will move with the armature of the damper motor since it is rigidly connected thereto through shafts 326 and 185' and the winding 367 will move with the gyro gimbal. Therefore, the displacement of the wiper 384 relative to the winding will represent the amount of twist in the rate spring 320 and the wiper 384 will signal pure rate as represented by the twist in shaft 320 due to the force exerted by the gyro gimbal. The wiper 389 is mounted on member 321 and will move with the damper motor armature since it is likewise rigidly connected thereto through shafts 326 and 185'. The displacement of wiper 389 relative to winding 390 will represent the total displacement of the motor armature and will give a signal of position only since the reaction force of the damper motor is proportional to angular velocity of the gyro gimbal.

Figure 28:
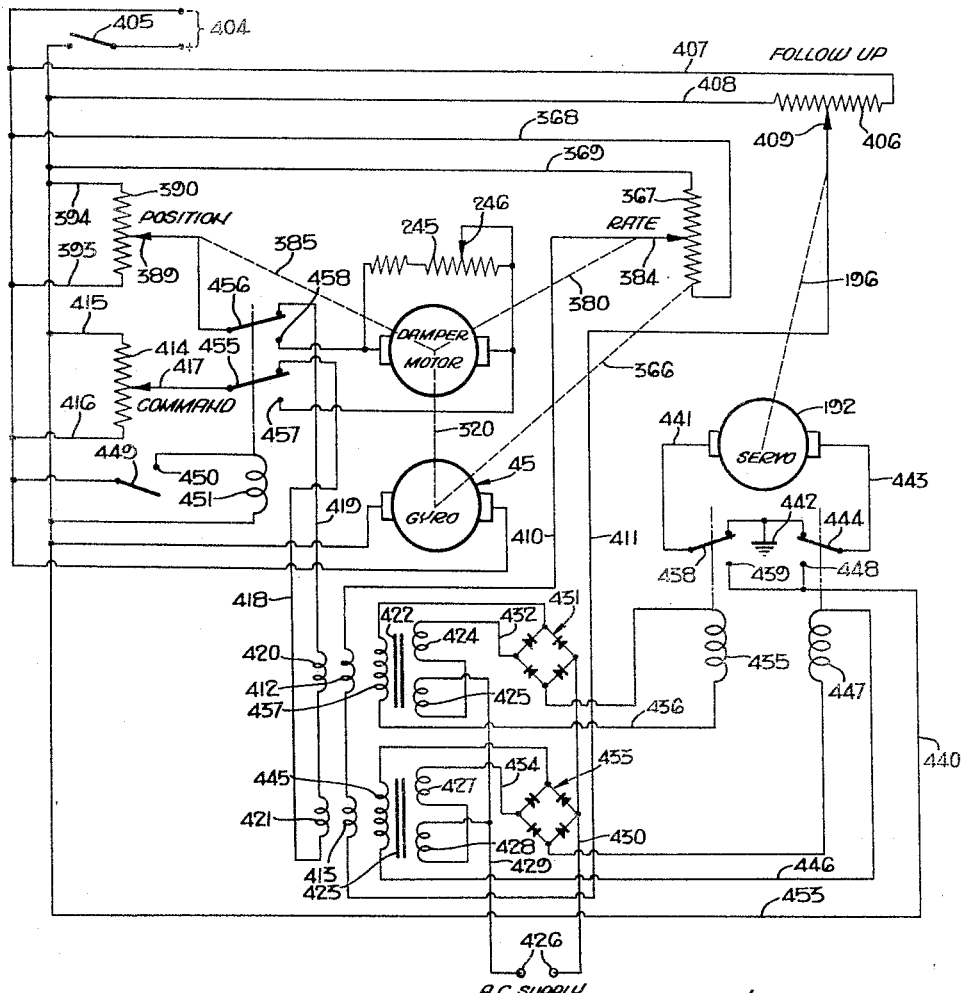
Figure 28 is a schematic wiring diagram for the control circuit utilizing the second modification of the invention and showing the manner in which the separate signals of rate and position are mixed for control purposes.
Figure 27:
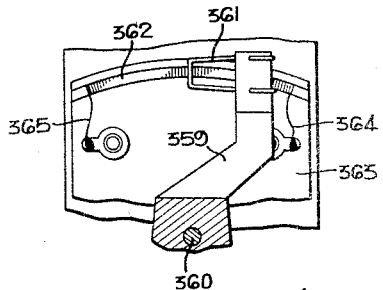
Figure 27 is a transverse vertical sectional view along line 27—27 of Figure 23 showing the details of the pickoff for the algebraic sum of rate and displacement.

It is therefore apparent that this modification of the invention provides a variety of signals and that the separate position and rate pickoffs can be utilized in a control system to replace the reference and rate gyros of the conventional system without a change in circuitry. The pickoff supplying the algebraic sum of rate and displacement can be utilized in the control system disclosed in the first form of the invention and therefore the utilization of the pickoff comprised of wiper 361 and winding 362 will not be further illustrated. However, a control system utilizing the separate position and rate pickoffs is illustrated in Figure 28 and it is understood that the gyroscope of this modification is positioned within mounting craft 191 with its spin axis vertical and the gimbal axis horizontal and transverse of the aircraft so as to be sensitive to movements about the roll axis. The system has a power source 404 which is under the control of manual switch 405 and the position pickoff winding 390 is connected across this source by leads 393 and 394 while the rate pickoff winding 367 is connected across the source by leads 368 and 369. The wiper 389 of winding 390 is shown connected to the damping motor by arm 385 while the wiper 384 of the rate pickoff is shown connected to the damping motor through arm 380. A follow-up winding 406 is connected across the power source by leads 407 and 408 and the wiper 409 for this winding is connected to the follow-up linkage 196 of servo 192.

The wipers of the rate pickoff and the follow-up pickoff are connected together through lines 410 and 411 which contain two control windings 412 and 413. A command signal winding 414 is connected across the power source through leads 415 and 416 and has a manually movable wiper 417 which can be utilized to change the position of the mounting craft about its roll axis. The wipers of the position pickoff and of the command pickoff are connected together through lines 418 and 419 which contain control windings 420 and 421. Thus, the rate pickoff and follow-up pickoff form one bridge circuit while the position pickoff and command pickoff form a second bridge circuit and any unbalance in either of the circuits will cause current to flow in one direction or the other through the control windings associated therewith. The control windings 412, 413, 420 and 421 form a part of a magnetic amplifier in which the signals from the rate potentiometer and the position potentiometer can be mixed in any desired manner. The amplifier has two cores 422 and 423 positioned within the fields developed by the control windings. Also, core 422 is energized by windings 424 and 425 and core 423 is energized by windings 427 and 428, all of which windings are connected to A.C. source 426 by lines 429 and 430. The coil 424 connects to full wave rectifier 431 through line 432 and coil 427 connects to full wave rectifier 433 through line 434. It is understood that movement of the aircraft in one direction about the roll axis will cause core 422 to saturate and that movement of the aircraft in the opposite direction about the roll axis will cause core 423 to saturate. When core 422 becomes saturated, a power output will be supplied to rectifier 431 which will in turn energize the solenoid winding 435 through line 436 and feedback coil 437. Upon energization of solenoid 435, the switch arm 438 will move against contact 439 and current will flow from line 440 to the servo motor 192 through line 441 and then to ground 442 through line 443 and switch arm 444. Thus, the servo will be energized in a direction determined by the mixture of the position signal and the rate signal. However, should the aircraft move in such a way that core 423 is saturated, energy will flow from coil 427 through rectifier 433, feedback winding 445 and line 446 to solenoid winding 447. The energization of winding 447 will move switch arm 444 against contacts 448 and current will flow from line 440 through line 443 to servo motor 192 and then to ground 442 through line 441 and switch arm 438. Thus, the servo will be energized in a reverse direction to move the aileron in order to control the aircraft in accordance with the mixed signal of rate and position. It is understood that any desired ratio of rate and position can be obtained by varying the size of one or more of the control windings.

As previously indicated, the pickoff comprised of wiper 361 and winding 362 can be utilized in the control system of Figure 11 and since the damper motor is equipped with a commutator, the gyro can be caged or torqued by energizing the armature of the damper motor. However, the control system of Figure 28, responsive to the separate position and rate pickoffs, can also be utilized to maneuver the craft by torquing the gimbal through the damper motor. When it is desired to maneuver the craft by movement of wiper 417 of the command potentiometer, the switch 449 is moved against contact 450 in order to energize solenoid winding 451 and move switch arms 455 and 456 against contacts 457 and 458, respectively, in order to connect the wiper 389 of the position pickoff and wiper 417 of the command pickoff through the damper motor. Thus, when the command wiper 417 is moved up or down relative to the corresponding position of the wiper 389, current will flow in one direction or the other through the damper motor in order to torque the gyro gimbal and cause the aircraft to turn in the corresponding direction until the position wiper balances the command wiper. The damper motor of the control circuit has a shunt winding 245 across the damper motor and a movable wiper 246 varies the load on the motor to vary the resistance torque of the motor to angular movement of the gimbal. Thus, the separate position and rate pickoffs can be utilized in the same control system as provided for these separate signals when derived from a position gyro and a rate gyro and the signals from these pickoffs can be mixed in any desired manner by the magnetic amplifier in order to control the servo motor. Also, the circuit provides for the command turns of the aircraft by energizing the armature of the damper motor through the commutator. It is understood that the rate signal can be modified by adjusting the flexibility of the torsion shaft 320 and that the signal from any one of the three pickoffs can be utilized in any desired manner for control purposes and need not necessarily be utilized in the manner suggested in Figure 28 and Figure 11.

By the present invention, a position and rate sensitive gyro is provided in which a single pickoff provides a signal of the algebraic sum of rate plus displacement of its mounting craft and such a signal is derived by connecting a single gimbal gyro to a low inertia damper motor in order to oppose the displacing movement of the gyro with a force proportional to the velocity of the displacement and by utilizing a spring connecting means so that the gyro gimbal can be displaced relative to the damping motor by an amount proportional to the force exerted by the gimbal. It is understood that various types of spring connections, including coil springs, can be utilized between the damper motor and the gyro gimbal and that the resistance of the spring to displacement by the gyro gimbal can be made variable. Also, while the control systems described are for controlling an aircraft about its roll axis, it is understood that the instrument of the present invention can be utilized to control any type of mounting craft, such as land, water or air vehicles, about any one of its control axes. The particular construction of the gyroscope and of the damper motor are not a part of this invention and it is understood that any gyro construction could be utilized and that any low inertia damper motor could likewise be utilized so long as its resistance to movement by the gimbal is proportional to the angular velocity of the gimbal. Such a motor should have minimum bearing friction and minimum eddy current losses and the armature should have minimum inertia. The invention can be utilized in a control system equipped with either an electrical or a mechanical follow-up device and with either type of follow-up, the gyro can be caged and torqued through selectively operable solenoids or by energizing the armature of the damper motor. The provision of pickoffs to measure pure rate and pure position make it possible to utilize the instrument in control circuitry which has been constructed for other types of control instruments and which require mixing of separate signals. While several control circuits have been illustrated, it is understood that modification in these systems can be made and that equivalent systems can be employed.

Various other modifications are contemplated by those skilled in the art without departing from the spirit and scope of the invention as hereinafter defined by the appended claims.

What is claimed is:

1. A gyroscopic device for controlling a movable craft about one axis thereof, comprising a gyro rotor mounted in a single gimbal for movement in response to angular movement of said craft about said axis, said gimbal exerting a torque proportional to the velocity of said angular movement, electrical means having two relatively rotatable members for producing a reaction torque proportional to the velocity of relative rotation, one of said members being a magnetic field producing member and the other of said members being a circular armature winding located within said magnetic field, and spring means connecting said gimbal to one of said members, said spring means being displaced an amount proportional to the torque exerted by said gimbal and said members being rotated relative to one another by an amount proportional to the displacement of said craft about said axis.

2. A gyro as defined in claim 1 wherein said spring means comprises a torsion shaft connected between said gimbal and said armature, and means for adjusting the effective length of said shaft to vary the twist imparted to said shaft by the force exerted by said gimbal.

3. A device as defined in claim 1 having single pickoff means positioned about the gimbal axis for obtaining a signal proportional to the algebraic sum of angular velocity and displacement of said craft.

4. A position and rate sensitive gyro for a movable craft comprising a gyro rotor mounted in a single gimbal for movement about the axis of said gimbal in response to movement of said craft about one axis thereof, damping motor means for producing a reaction torque upon said gimbal comprising a stationary magnetic field and an armature winding rotatable within said field, said reaction torque being proportional to the velocity of rotation of said armature winding, spring means for connecting said gimbal to said armature winding and commutator means for energizing said armature winding to selectively produce a torque upon said gimbal.

5. A gyro as defined in claim 4 having a gear train connected to said spring means and interposed between said armature and said gimbal to provide a high armature-to-gimbal mechanical advantage and minimize the effect of commutator friction upon movement of the gimbal.

6. A gyro as defined in claim 4 having an adjustable shunt means connected across said armature for varying the reaction torque on said gimbal.

7. A position and rate sensitive gyro for a movable craft comprising a gyro rotor mounted in a single gimbal for movement about the axis of said gimbal in response to movement of said craft about one axis thereof, means for producing a reaction torque upon said gimbal comprising a stationary magnetic field and an armature rotatable within said field, said armature being comprised of windings impregnated with a plastic material to make the windings self-supporting and to eliminate eddy current losses, and spring means for connecting said gimbal to said armature, said gimbal assuming a position relative to said craft which is proportional to the algebraic sum of angular velocity and displacement of said craft about said axis.

8. A gyro as defined in claim 7 wherein said spring means contains a gear train coupler having a high armature-to-gimbal mechanical advantage, said armature being provided with commutator bars and brushes in order to selectively energize said armature and torque said gyro gimbal in one direction or the other, said gear train coupler providing means to minimize the effect of brush friction upon the movement of said gimbal.

9. A control system for positioning a movable craft about one axis thereof comprising a gyroscope having a gyro rotor mounted by a single gimbal, said gyroscope exerting a torque proportional to the angular velocity of said craft about said axis, electrical means comprising a fixed field and rotatable armature for producing a restraining torque on said gyroscope proportional to the angular velocity of said gyroscope, adjustable load means connected across said armature for varying said restraining torque, spring means connecting said gimbal to said armature so that said spring means will be displaced in proportion to the force exerted by said gimbal and pickoff means positioned about the gimbal axis to control the position of said craft in accordance with the algebraic sum of displacement and angular velocity of said craft about said axis.

10. A control system as defined in claim 9 wherein said pickoff means comprises a potentiometer, a servo motor controlled by said pickoff potentiometer to position said craft and a follow-up potentiometer moved by said servo motor, said potentiometers having wipers connected together through a solenoid winding, and switch means operated by said solenoid winding to energize said servo motor in one direction or the other in accordance with the direction of current flow between the wipers.

11. A control system as defined in claim 9 having a bridge circuit comprised of a trim potentiometer and a command potentiometer connected in parallel and each having a wiper connected with said armature, the position of said trim wiper being fixed so that movements of said command wiper will energize said electrical means in one direction or the other in order to torque the gyro gimbal in the corresponding direction.

12. A control system as defined in claim 11 wherein said pickoff means comprises a potentiometer having a wiper, selectively operated switch means for disconnecting the wiper of said command potentiometer from said armature and connecting the wiper of said pickoff potentiometer to said armature so that said trim potentiometer and said pickoff potentiometer form elements of a bridge circuit, said electrical means being energized by current flow between said pickoff wiper and said trim wiper to move said gyro gimbal to a position preselected by said trim wiper.

13. A control system for positioning a movable craft about one axis thereof comprising a gyroscope having a gyro rotor mounted by a single gimbal, said gyroscope exerting a torque proportional to the angular velocity of said craft about said axis, electrical means comprising an armature rotatable with a fixed field for producing a restraining torque on said gyroscope proportional to the angular velocity of said gyroscope, spring means connecting said gimbal to said armature so that said spring means will be displaced in proportion to the force exerted by said gimbal, an on-off pickoff positioned about the gimbal axis, a servo motor controlled by said pickoff in order to position said craft about said axis and mechanical follow-up means connected to said on-off pickoff and movable by said servo motor.

14. A control system as defined in claim 13 having selectively operable means independent of said electrical means for caging said gyroscope to a preselected position and selectively operable means independent of said electrical means for torquing said gyro gimbal in one direction or the other to selectively turn the craft.

15. A gyroscopic device for controlling a movable craft about one axis thereof, comprising a gyro rotor mounted in a single gimbal for movement in response to angular movement of said craft about said axis, said gimbal exerting a torque proportional to the velocity of said angular movement, means having two relatively rotatable members for producing a reaction torque proportional to the velocity of relative rotation, connecting means rigidly connected to one of said relatively rotatable members and a spring means connected to said gimbal, said connecting means and said spring means being connected together, and pickoff means for sensing the displacement of said gimbal relative to said connecting means to signal the angular velocity of said craft.

16. A device as defined in claim 15 having second pickoff means for sensing the displacement of said connecting means relative to said craft to signal displacement of said craft about said axis.

17. A device as defined in claim 16 having a third pickoff means for sensing the displacement of said gimbal relative to said craft to signal the algebraic sum of angular velocity and displacement of said craft about said axis.

18. A device as defined in claim 16 having means for mixing the signals from said first and second pickoff means in order to signal the algebraic sum of angular velocity and displacement of said craft and means responsive to said mixing means for controlling the position of said craft about said axis.

19. A device as defined in claim 15 wherein said spring means comprises a torsion rod which is twisted by the force exerted by said gimbal.

20. A position and rate gyro for a movable craft comprising a gyro rotor mounted in a single gimbal for movement about the gimbal axis in response to movement of said craft about one axis thereof, reaction torque producing means comprising a stationary electrical field and a low inertia armature rotatable within said field, spring means having one end connected to said gimbal, rigid connecting means connected between the other end of said spring means and said armature and pickoff means for sensing the displacement of said gimbal relative to said connecting means to signal the angular velocity of said craft about said axis.

21. A device as defined in claim 20 having a second pickoff means for sensing the displacement of said connecting means relative to said craft to signal displacement of said craft about said axis.

22. A device for controlling a movable craft about one axis thereof comprising a gyroscope having a gyro rotor mounted by a single gimbal, said gyroscope exerting a torque proportional to the angular velocity of said craft about said axis, low inertia electrical means having relatively movable members for producing a reaction force proportional to the velocity of said relative movement, means connected with said electrical means for varying the proportionality factor of said reaction force, and spring means for connecting said gimbal with one of said relatively movable members so that the displacement of said spring means will be proportional to angular velocity of the craft and the amount of relative movement between said members will be proportional to displacement of said craft about said axis.

23. A device as defined in claim 22 wherein said electrical means is comprised of a low inertia damper motor having its armature connected by said spring means to said gimbal for rotation thereby.

24. A device as defined in claim 22 wherein one member of said electrical means is a fixed field means and the other member is a winding connected to said spring means and movable within the field of said fixed means, said winding being mounted for movement by low-inertia bearings to minimize the effect of said winding on gimbal inertia, and non-magnetic means for supporting said winding to eliminate eddy current losses in said electrical means.

25. A position and rate sensitive gyro for a movable craft comprising a gyro rotor mounted on a single gimbal for movement about the axis of said gimbal in response to movement of said craft about one axis thereof, spring means having one end connected to said gimbal for movement therewith, low inertia electrical damping motor means comprising a stationary field and an armature winding rotatable within said field for producing a restraining force on said gimbal proportional to the velocity of rotation of said armature winding, and means for connecting said armature winding to the other end of said spring means so that the position of said gimbal is a function of the angular velocity and displacement of the craft about said one axis, said armature winding being wholly composed of non-magnetic material to minimize electrical losses in said motor means.

26. A gyro as defined in claim 25 wherein said spring means comprises a torsion shaft connected between said gimbal and said armature winding.

27. A gyro as defined in claim 25 having single pickoff means positioned about the gimbal axis and servo means controlled by said pickoff means to position said craft about said axis.

28. A gyro as defined in claim 25 having commutator means connected with said armature winding for selectively energizing said armature winding to produce a torque upon said gimbal.

29. A gyro as defined in claim 25 having adjustable shunt means connected across said armature winding to vary the proportionality factor of said restraining force on said gimbal.

30. A device for controlling a movable craft about one axis thereof comprising first means for exerting a force proportional to the angular velocity of displacement of said craft about said axis and mounted for movement in response to displacement of said craft, second means for producing a restraining force on said first means proportional to the velocity of movement of said first means, rigid means connected to said second means and spring means connected to said first means, said rigid means and said spring means being connected together, pickoff means for sensing the displacement of said first means relative to said rigid means to signal the rate of angular displacement of said craft, and second pickoff means for sensing the displacement of said rigid means relative to said craft to signal displacement of said craft about said axis.

31. A gyroscopic device for controlling a movable craft about one axis comprising, a gyro rotor mounted in a single gimbal for movement in response to angular movement of said craft about said axis, said gimbal exerting a torque proportional to the velocity of angular movement, means having two relatively movable members for producing reaction torque proportional to the velocity of relative movement, and means for connecting said gimbal to one of said members to cause relative movement of said members by said gimbal, said connecting means comprising spring means and a gear train connected with said spring means to provide a member-to-gimbal mechanical advantage and thereby minimize the effect of friction.

32. A gyroscopic device for controlling a movable craft about one axis thereof comprising a gyro rotor mounted in a single gimbal for movement in response to angular movement of said craft about said axis, said gimbal exerting a torque proportional to the velocity of angular movement, a reaction torque producer comprising two relatively movable means for producing a reaction torque proportional to the velocity of relative movement, spring means for connecting said gimbal to one of said relatively movable means to produce said relative movement, one of said relatively movable means comprising a field producing means and the other of said relatively movable means comprising means located within the field of said field producing means for producing said reaction torque and selectively energizable for coaction with said field to selectively produce a torque upon said gimbal.

33. A gyroscopic device as defined in claim 32 having commutator means for selectively energizing the means located within said field.

34. A gyroscopic device for controlling a movable craft about one axis thereof, comprising a gyro rotor mounted in a single gimbal for movement in response to angular movement of said craft about said axis, said gimbal exerting a torque proportional to the velocity of said angular movement, means having two relatively movable members for producing a reaction torque proportional to the velocity of relative movement, connection means including spring means for connecting one of said relatively movable members to said gimbal, first pickoff means for sensing the displacement of said gimbal relative to said craft to signal the algebraic sum of angular velocity and displacement of said craft about said axis, and second pickoff means for sensing the displacement of said gimbal relative to said one member to signal the angular velocity of said craft.

35. A gyroscopic device for controlling a movable craft about one axis thereof, comprising a gyro rotor mounted in a single gimbal for movement in response to angular movement of said craft about said axis, said gimbal exerting a torque proportional to the velocity of said angular movement, means having two relatively movable members for producing a reaction torque proportional to the velocity of relative movement, connection means including spring means for connecting one of said relatively movable members to said gimbal, first pickoff means for sensing the displacement of said gimbal relative to said craft to signal the algebraic sum of angular velocity and displacement of said craft about said axis, and second pickoff means for sensing the displacement of said one member relative to said craft to signal displacement of said craft about said axis.

36. In a gyroscope, a rotor and spinning means therefor, gimbal means mounting said rotor for rotational movement about its spin axis, bearing means pivotally mounting said gimbal about a displacement axis normal to said spin axis and on a support for the gyroscope, a damper and a torsion rod connected to one extremity of said gimbal, the torsion rod being connected between said gimbal and said damper and said damper in part being fixed to said support for the gyroscope, signal generating means including relatively movable parts one of which is mounted on said gimbal and the other mounted on a movable portion of the damper, a second signal generating means including relatively movable parts one part of which is mounted on the movable part of said damper and the second part of which is mounted on said support, and a third signal generating means including relatively movable parts one part of which is mounted on said gimbal means and the other of which is mounted on said support.

37. In combination, a single degree of freedom gyroscope including a rotor and spinning means therefor and a gimbal means mounting said rotor for rotational movement, means mounting said gimbal rotor for limited pivotal movement on a support and about an axis normal to the axis of rotation of said rotor, elastic means connected in part to said gimbal means for restraining said limited pivotal movement of said gimbal, damping means connected in part to said elastic means and in part to said support for damping movement of said elastic means relative to said support, a first signaling device measuring movement of said elastic means, and a second signaling device measuring movement of said damping means.

References Cited in the file of this patent

UNITED STATES PATENTS

| | | |
|---|---|---|
| 1,831,597 | Henderson | Nov. 10, 1931 |
| 1,900,709 | Henderson | Mar. 7, 1933 |
| 2,299,117 | Von Manteuffel | Oct. 20, 1942 |
| 2,590,428 | Noxon | Mar. 25, 1952 |
| 2,595,268 | Kellogg | May 6, 1952 |
| 2,646,947 | Kutzler et al. | July 28, 1953 |
| 2,672,054 | Warren et al. | Nov. 16, 1954 |
| 2,709,921 | Sylvan | June 7, 1955 |
| 2,712,757 | Schaberg | July 12, 1955 |

UNITED STATES PATENT OFFICE
CERTIFICATE OF CORRECTION

Patent No. 2,951,374　　　　　　　　　　　September 6, 1960

Thomas O. Summers, Jr.

It is hereby certified that error appears in the above numbered patent requiring correction and that the said Letters Patent should read as corrected below.

Column 22, line 11, strike out "and"; line 12, for "damping means." read -- damping means, and a third signaling device measuring movement of said gimbal relative to said support. --.

Signed and sealed this 5th day of June 1962.

(SEAL)
Attest:

ERNEST W. SWIDER
Attesting Officer

DAVID L. LADD
Commissioner of Patents